(12) United States Patent
Ferryanto et al.

(10) Patent No.: US 7,389,212 B2
(45) Date of Patent: Jun. 17, 2008

(54) SYSTEM AND METHOD OF INTERACTIVE DESIGN OF A PRODUCT

(75) Inventors: Liem Ferryanto, Windsor (CA); Mahesh Vora, Farmington Hills, MI (US); Agus Sudjianto, Matthews, NC (US)

(73) Assignee: Ford Motor Company, Dearborn, MI (US)

( * ) Notice: Subject to any disclaimer, the term of this patent is extended or adjusted under 35 U.S.C. 154(b) by 490 days.

(21) Appl. No.: 10/946,652

(22) Filed: Sep. 22, 2004

(65) Prior Publication Data

US 2006/0064288 A1  Mar. 23, 2006

(51) Int. Cl.
  *G06F 17/10* (2006.01)
(52) U.S. Cl. .......... 703/2; 700/97; 703/1; 703/6; 703/7; 703/8
(58) Field of Classification Search ............. 703/1–2, 703/6–8; 700/97
  See application file for complete search history.

(56) References Cited

U.S. PATENT DOCUMENTS

| | | | |
|---|---|---|---|
| 4,821,214 A | 4/1989 | Sederberg | |
| 5,119,309 A | 6/1992 | Cavendish et al. | |
| 5,179,644 A | 1/1993 | Chiyokura et al. | |
| 5,253,331 A | 10/1993 | Lorenzen et al. | |
| 5,903,458 A | 5/1999 | Stewart et al. | |
| 6,377,908 B1 * | 4/2002 | Ostrowski et al. | 703/2 |
| 6,931,366 B2 * | 8/2005 | Wang et al. | 703/2 |
| 6,980,939 B2 * | 12/2005 | Dhir et al. | 703/7 |
| 7,092,845 B2 * | 8/2006 | Keane et al. | 702/182 |
| 2003/0040954 A1 * | 2/2003 | Zelek et al. | 705/10 |

OTHER PUBLICATIONS

Hu et al., "Enhancing Robust Design with the Aid of TRIZ abd Axiomatic Design (Part 1)", http://citeseer.csail.mit.edu/hu00enhancing.html, 2000.*
Andersson, "Sensitivity Analysis in Pareto Optimal Design", http://www.lania,mx/~ccoello/EMOO/andersson02a.pdf.gz, Mar. 2004.*
Gu et al., "A New Approach for Robust Design of Mechanical Systems", CIRP Annals—Manufacturing Technology, vol. 53, Issue 1, 2004, pp. 129-133.*

* cited by examiner

*Primary Examiner*—Kamini S Shah
*Assistant Examiner*—Herng-der Day
(74) *Attorney, Agent, or Firm*—Gifford, Krass, Sprinkle, Anderson & Citkowski, P.C.; Gary Smith

(57) ABSTRACT

A system and method for interactive design of a product includes the steps of identifying an ideal design solution by identifying an unnecessary design parameter having a predetermined significant influence on a variable design response and fixing a predetermined nominal value of the identified unnecessary design parameter at which the variable design response is a minimum and the product design is an uncoupled design or a decoupled design. The method also includes the steps of selecting a most robust ideal design solution from the identified ideal design solution that is the most uncoupled design or the most decoupled design. The method further includes the steps of optimizing the most robust ideal design solution to obtain a pareto-optimal design solution for use in the design of the product that includes a design parameter having an independent design response.

9 Claims, 7 Drawing Sheets

| Measures | 5-95 IQR For Airflow Rate | | | | 5-95 IQR For Charge Motion Ratio | | | |
|---|---|---|---|---|---|---|---|---|
| | Initial | Design A | Design B | Design C | Initial | Design A | Design B | Design C |
| Mean | 6.15 | 2.74 | 2.28 | 6.40 | 0.081 | 0.061 | 0.053 | 0.070 |
| StDev | 2.44 | 0.87 | 1.66 | 2.80 | 0.036 | 0.029 | 0.031 | 0.030 |
| Median | 5.84 | 2.74 | 1.95 | 1.21 | 0.081 | 0.048 | 0.039 | 0.050 |
| 25-75 IQR | 3.49 | 1.46 | 2.53 | 3.82 | 0.060 | 0.058 | 0.047 | 0.051 |
| VR_Mean(%) | — | 55.40 | 62.90 | -4.10 | — | 24.500 | 35.100 | 19.600 |
| VR_Median(%) | — | 53.00 | 66.70 | -23.40 | — | 40.800 | 51.600 | 44.400 |

Fig. 5a. — 300

| Measures | Median For Airflow Rate | | | | Median For Charge Motion Ratio | | | |
|---|---|---|---|---|---|---|---|---|
| | Initial | Design A | Design B | Design C | Initial | Design A | Design B | Design C |
| Mean | 269.37 | 273.85 | 281.56 | 278.22 | 0.624 | 0.606 | 0.567 | 0.690 |
| StDev | 9.43 | 7.19 | 6.40 | 7.56 | 0.107 | 0.090 | 0.105 | 0.050 |
| Median | 269.37 | 273.62 | 281.94 | 278.12 | 0.641 | 0.638 | 0.577 | 0.670 |
| 25-75 IQR | 13.64 | 10.51 | 12.44 | 12.77 | 0.140 | 0.151 | 0.182 | 0.024 |
| OL_Mean(%) | — | 1.30 | 4.50 | 3.30 | — | -2.900 | -9.200 | 10.200 |
| OL_Median(%) | — | 1.60 | 4.70 | 3.20 | — | -0.500 | -10.000 | 5.100 |

Fig. 5b. — 350

SYSTEM AND METHOD OF INTERACTIVE DESIGN OF A PRODUCT

BACKGROUND OF THE INVENTION

1. Field of the Invention

The present invention relates generally to computer-assisted design of models and, more specifically, to a system and method of interactive redesign of a product having a pareto-optimal and robust solution.

2. Description of the Related Art

Most systems typically include multiple variables that influence the performance of the system. A highly complex system, such as a vehicle, includes a large number of interrelated variables. These variables induce multiple system responses, which result in tradeoffs in system design. Various optimization techniques are known in the art for optimizing a multiple response system in the absence of noise. For example, these techniques emphasize the numerical evaluation of the weighted sum quality loss. However, these techniques do not address the nature of variations associated with individual responses, and oftentimes lead to coupled responses that leave no freedom for change in the system.

The advancement of computer-aided design (CAD) techniques in vehicle design, and in particular automotive vehicle design, enhances product design. At the same time, enhanced visualization software tools have been developed that allow for interactive display and manipulation of large geometric models, including models developed using computer-aided design (CAD). Another advancement is in the use of mathematically based software tools, collectively referred to as computer-aided engineering (CAE), to constrain and guide the designer in evaluating the design. The use of a CAE simulation allows for verification of a design intent and a prediction of a mechanical behavior of the design, including its systems, subsystems and components. Recent enhancements to the computing power of modern computers have resulted in a reduction in the amount of time required to perform the CAE analysis. Therefore, CAE tools can be utilized earlier in the design process and applied to a wider range of product development activities. In addition probabilistic based software tools are becoming available for selectively analyzing the overall reliability and robustness of a design. The combined use of computer-aided design, visualization techniques, and optimization techniques is especially beneficial in the design of a new product, or redesign of an existing product. Advantageously, potential designs can be considered in a timely and cost-effective manner using analytical techniques, versus using an actual vehicle model.

Commonly assigned U.S. Patent Application Publication Number US 2002/0143503, which is incorporated herein by reference, discloses a system and method for selectively analyzing the overall reliability and robustness of a design using probability and statistical methods. While this methodology works well, it does not utilize axiomatic design principles to obtain a pareto-optimal and robust solution.

Frequently, the design of a product can be improved upon by varying a design parameter, such as size or geometry, without changing the product's basic design configuration. Since most product designs are not robust and are redundant or dependent, optimization of the design involves trade-off between features. However, approaches utilized heretofore do not address the benefits of designs with independent design responses. These approaches merely focus on the robustness or reduction of information content, which may not be the most robust design. Thus, there is a need in the art for a method of redesigning a product having multiple responses that takes advantage of axiomatic design principles to determine a design that is both robust and optimal.

SUMMARY OF THE INVENTION

Accordingly, the present invention is a system and method for interactive redesign of a product using a pareto-optimal and robust solution. The system includes a user computer system and a remotely located computer system in communication with the user computer system. The system also includes a computer-generated geometric model of a product design stored in a data storage means. The system further includes a statistical analysis software program implemented by the remotely located computer system and a computer aided engineering software program implemented by the remotely located computer system.

The method is implemented by an executable product design software program, and includes the steps of identifying an ideal design solution for the product design by identifying an unnecessary design parameter having a predetermined significant influence on a variable design response and fixing a predetermined nominal value of the identified unnecessary design parameter at which the variable design response is a minimum and the product design is an uncoupled design or a decoupled design. The method also includes the steps of selecting a most robust ideal design solution from the identified ideal design solution that is the most uncoupled design or the most decoupled design. The method further includes the steps of optimizing the most robust ideal design solution to obtain a pareto-optimal design solution for use in the design of the product that includes a design parameter having an independent design response.

One advantage of the present invention is that a system and method of interactive redesign of a product is provided that uses axiomatic design principles to integrate pareto-optimal and robust solutions. Another advantage of the present invention is that the methodology utilizes a mathematical process to analyze the design variables that influence the design. Still another advantage of the present invention is that the methodology is a data driven process and is less reliant on the expertise of an individual. A further advantage of the present invention is that a system and method is provided that automates the process of redesigning a product, to improve the quality of the model. Still a further advantage of the present invention is that a system and method is provided with integral expert systems that are not dependent on the expertise of the user. Still a further advantage of the present invention is that a system and method is provided that is simpler to use and reduces the amount of time required to redesign the product.

Other features and advantages of the present invention will be readily appreciated, as the same becomes better understood after reading the subsequent description taken in conjunction with the accompanying drawings.

BRIEF DESCRIPTION OF THE DRAWINGS

FIGS. 6a-6d are graphs illustrating the benefit of selecting an uncoupled design and a decoupled design versus an initial design and a coupled design, according to the present invention.

DESCRIPTION OF THE PREFERRED EMBODIMENT(S)

A design of a model of a system is preferably achieved with a generic, parametric driven design process. Advantageously, the parametric process allows for flexibility in design and engineering analysis of the model in a fraction of the time required using conventional design methods. Various computer-based tools are integrated to achieve this enormous time and expense savings, including solid modeling, parametric design, and probabilistic-based software.

If the design of a new product is considered the solution to a particular need, the redesign of the product is an improved solution. The improved solution generally involves varying existing design parameters. Variant design involves varying a design parameter without changing the product's basic design configuration. The design optimization of a complex system typically involves multiple responses.

Figure 3:
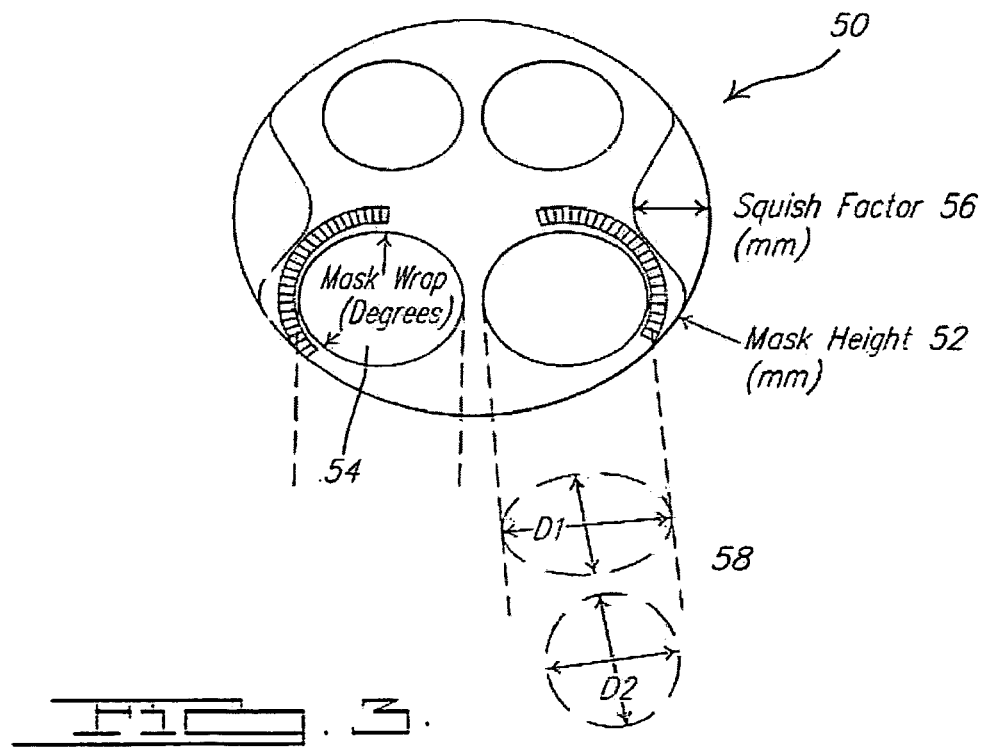
FIG. 3 is a sectional view of a cylinder head for the system of FIG. 1, according to the present invention.

In this example, the process is applied to a vehicle engine, although other types of systems are foreseeable. A computer-generated geometric model representing a design form for a portion of the engine, such as a cylinder head, is shown at 50 of FIG. 3. The engine design is typically generated through the use of conventional computer-aided design (CAD), including computer-aided manufacturing (CAM) and computer-aided engineering (CAE) techniques.

Figure 1:
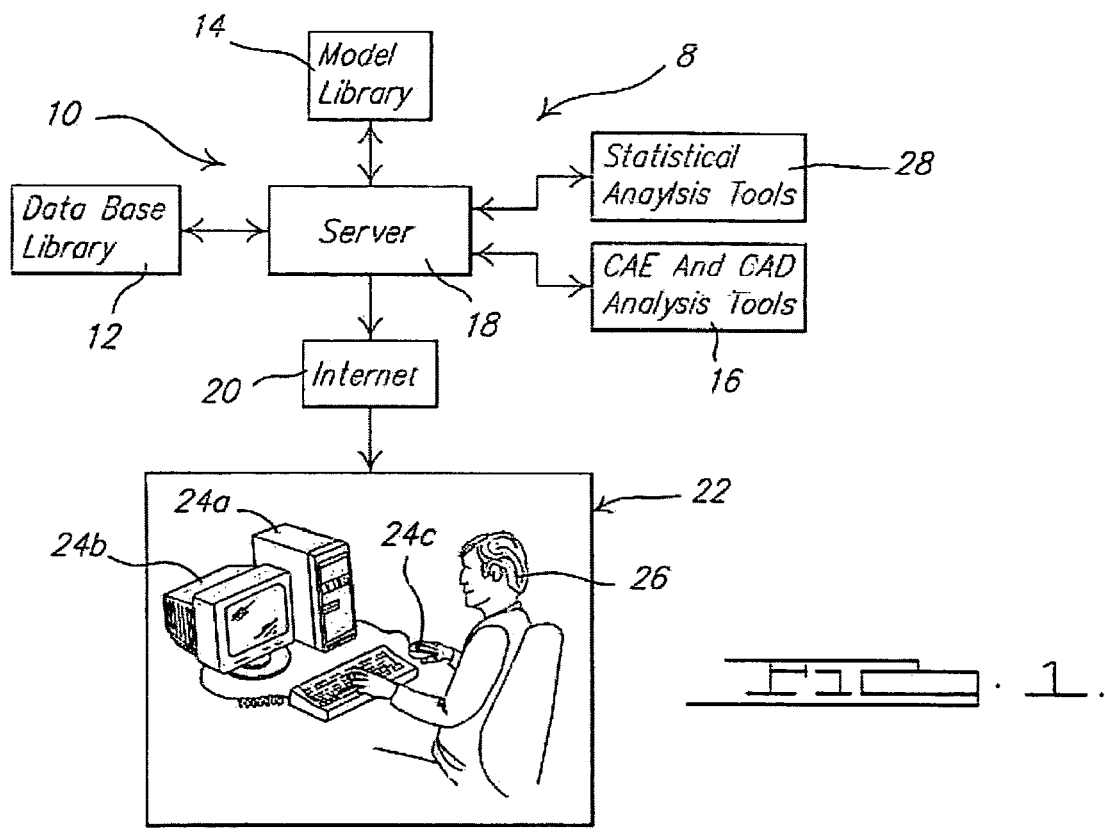
FIG. 1 is a diagrammatic view of a system for use in conjunction with a method of interactive design of a product, according to the present invention.

Referring to the drawings and in particular to FIG. 1, a system 8 for interactive design of a product, having a solution that is optimal and robust is illustrated.

The system 8 includes a remotely located computer system 10. The remotely located computer system 10 includes a server 18 having a processor, and a memory. The remotely located computer system 10 is in communication with a user computer system 22, to be described, using a communications network 20. The communications network 20 may include the Internet, an intranet or the like that is known in the art for transferring information electronically.

The system 8 includes a knowledge-based engineering library 12, preferably stored on an electronic storage device in communication with the server 18. The knowledge-based engineering library 12 preferably includes a database of sub-libraries containing an electronic representation of data including various experts' knowledge of information relevant to the design of a product, such as the engine of this example. These sub-libraries may include information such as design, assembly, manufacturing, or quality rules and guidelines. For example, the quality knowledge-based engineering library may include guidelines establishing best practices in an area, such as manufacturing or the like. In this example, the quality guideline may be a customer-driven feature, such as fuel economy or reliability or the like.

The knowledge-based engineering library 12 may also contain data in electronic form regarding various types of subsystems of the product, such as a component parts library of particular component parts associated with the engine. For example, the knowledge-based engineering library 12 may further contain predetermined product assumptions regarding the product to be designed, such as model year, style, or production volume.

The computer system 10 also includes a model library 14, preferably stored on a remotely located electronic storage device. In this example, the model library 14 contains models, or an electrical representation of the product or a portion thereof, such as individual components. For example, the model library may include CAD data or mesh modeling data for a particular component part. It should be appreciated that the model library 14 may be a sub-library of the knowledge-based engineering library 12.

The computer system 10 may also include various computer-aided design (CAD) tools and computer-aided engineering (CAE) tools 16, which can be used in conjunction with the method, to be described. The CAD tools 16 may include solid modeling, visualization and parametric design techniques. Solid modeling, for example, takes electronically stored vehicle model data from the model library 14 and standard component parts data from the knowledge-based engineering library 12 and builds complex geometry for part-to-part or full assembly analysis. Several modeling programs are commercially available and generally known to those skilled in the art.

The CAE tools 16 may include finite element analysis (FEA) or computational fluid dynamics (CFD) analytical techniques. Several software programs are commercially available to perform these analyses and are generally known to those skilled in the art. The selection of the software tool is dependent on the capability of the particular software tool and the model being assembled. It should be appreciated that the selection of the software tool will affect the integrity of the assembled model, and it is foreseeable that different tools can generate different models.

The system 8 further includes various statistical and reliability analysis tools 28. Several software programs are commercially available to perform these types of analysis, and are generally known to those skilled in the art. Examples of commonly available statistical reliability techniques known in the art include a First Order Reliability Method (FORM), Second Order Reliability Method (SORM), Saddle Point Approximation Method (SPAM) or Quasi-Monte Carlo. An example of a software program is ANOVA, which is a variable analysis of variance statistical methods.

The system 8 includes a user computer system 22, having a processor, a controller, and a memory shown at 24a to process information relevant to the method stored in the processor 18 for interactively designing a product having a pareto-optimal and robust solution. The user computer system 22 includes a display device 24b, such as a video terminal, to display information relating to the new model.

In this example, information is displayed on the display device 24b in a series of screens, also referred to as a browser. A user 26 inputs information into the computer system 22 when prompted to do so. The information may represent different parameter alternatives. The set of parameters or the set of instructions may be specific to the method of interactive design of a product having a pareto-optimal and robust solution wherein other data and information non-specific to the method may already be stored in the memory of the computer system 22. Selection and control of the information within a screen can be achieved by the user 26, via a user interactive device 24c, such as a keyboard or a mouse.

An example of an input method is a drawing technique used to draw a box around a local region of the model using the user interactive device 24c, such as the mouse. It should be appreciated that the drawing process includes a click, drag and release of the mouse, as is understood in the art. Another type of input method is a graphical user interface that allows menu selection, parameter modification and performs other types of viewing operations. Still another example of an input method is a pop-up dialog box containing available information or instructions. Preferably, the computer system 22 is configured to provide for fast display capability for rendering and viewing of large complex mesh models.

The computer system 22 utilizes the set of information or instructions from the user 26, information from the libraries 12, 14, design and analysis tools 16 and any other information in carrying out a method, according to the present invention and discussed in detail subsequently, of interactive design of a product by integrating probabilistic software tools with engineering knowledge and best practices.

The methodology integrates available software tools into one environment to analyze the input design parameters with respect to a geometric model to attain the desired solution. Preferably, the methodology interfaces between these software tools, to ensure that the tools are compatible, and applied in a consistent manner using best practice guidelines.

It should be appreciated that the above-described methodology is executable in an iterative manner, since the user 26 may elect to consider various sets of design parameters as part of a comprehensive study, or compare the results of the methodologies for modifying a design parameter. The methodology preferably provides the design solution in a user-defined format.

Advantageously, this is a time and cost savings as compared to previous methods of analyzing a design relying an individual's analysis of data. In addition, the computer-implemented method of interactive design of a product combines all of the foregoing to provide an efficient, flexible, rapid tool for evaluating the various design proposals. Furthermore, the analysis is available for further study.

Figure 2:
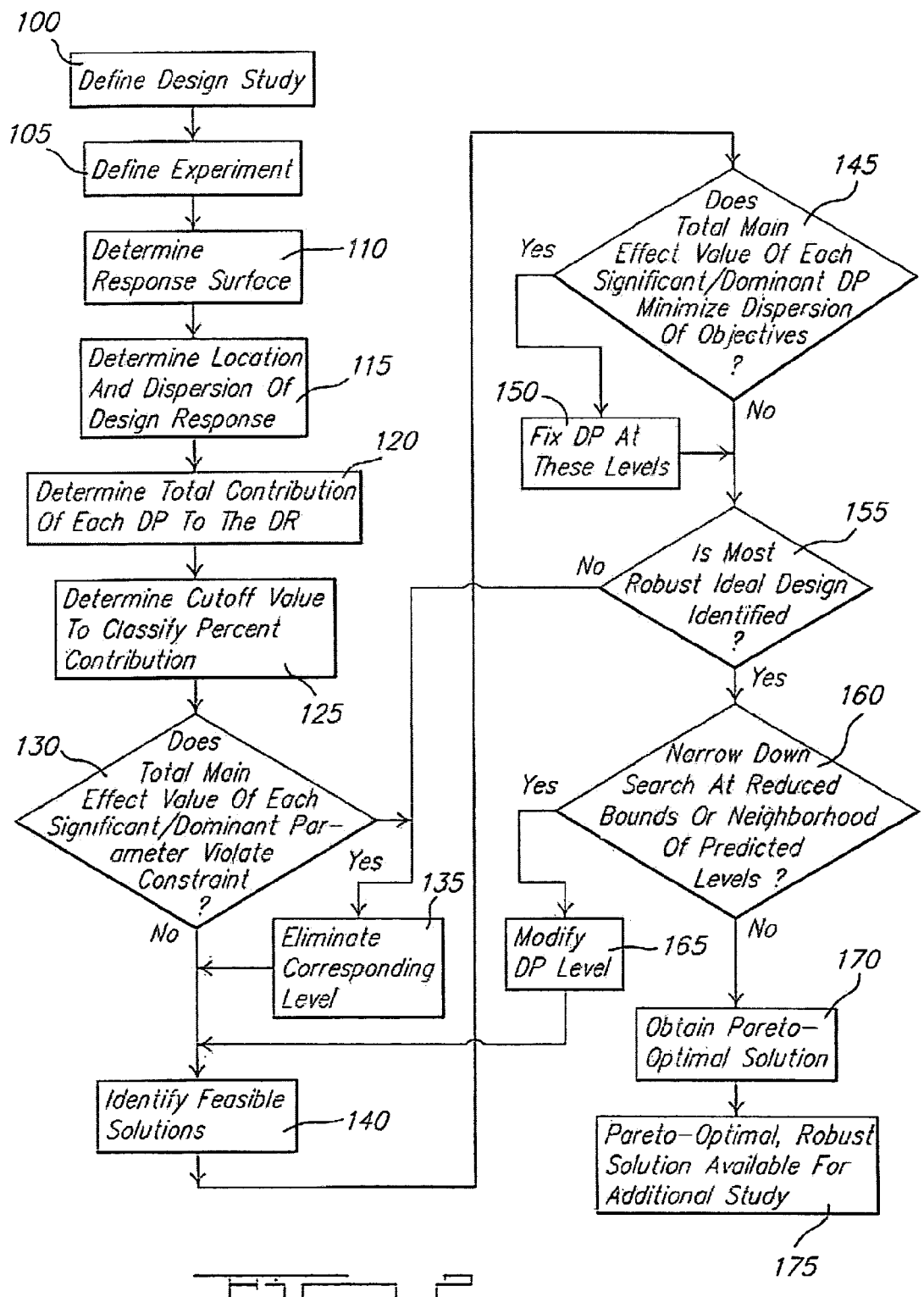
FIG. 2 is a flowchart of a method of interactive design of a product using the system of FIG. 1, according to the present invention.

Referring to FIG. 2, a diagrammatic overview of a method for interactive design of a product using a pareto-optimal and robust solution according to axiomatic design principles is illustrated. It is known that the design of a product, such as a vehicle engine, typically involves tradeoffs in design parameters. For an engine, there is a design tradeoff between maximizing airflow for power and increasing charge motion to promote good fuel-air mixing. The design process advantageously integrates available software tools with engineering knowledge to obtain a design solution that is both optimized and robust with respect to existing design parameters.

A solution to a design problem is a pareto-optimal solution if there exists no other feasible solution that will bring an improvement in one response without degrading at least one other response. Further, the solution is robust if it satisfies the Independence Axiom, that is a design that is most uncoupled or decoupled based on the degree of coupling, variation reduction measures and optimality measures.

A system generally having M design responses (DR) and N design parameters (DP) can be represented in matrix form as $$\begin{bmatrix} DR_i \\ \vdots \\ DR_m \end{bmatrix} = \begin{bmatrix} A_{ij} & \cdots & A_{ij} & \cdots & A_{in} \\ \vdots & & \vdots & & \vdots \\ A_{mi} & & A_{mj} & & A_{mn} \end{bmatrix} \begin{Bmatrix} DP_i \\ \vdots \\ DP_n \end{Bmatrix}$$

For $$A_{ij} = \frac{\delta DR_i}{\delta DP_j},$$

for i=1, . . . , m and j=1, . . . , n. This characterizes the sensitivity of the system.

Accordingly, in the presence of additive noises or variability, a design system with M responses and N parameters, for m≦n can be expressed as:

$$\{DR_i + \delta(DR_i)\} = [A_{ij}]\{DP_j + \delta(DP_j)\} \tag{1}$$

for I=1, . . . , m and j=1, . . . , n. $\{DR_i+\delta(DR_i)\}$ and $\{DP_j+\delta(DP_j)\}$ response and the parameter vectors of the product with their nominal and variation values, respectfully, and $[A_{ij}]$ is the design matrix of space of the product. Noise, as a result of the manufacturing process, an environmental condition, material degradation and the variation of the design system are taken into consideration in the variation of design parameters $\delta(DP_j)$. $A_{ij}=\delta DR_i/\delta DP_j$ characterizes the sensitivity of the system, that is, a change in $DP_j$ will proportionally change $DR_i$. For a linear design, the $A_{ij}$ are constants, whereas for a nonlinear design, the $A_{ij}$ are function of $DP_j$. The goal is to minimize the variation of DP or to bring the variation within a desired tolerance.

The first equation can be decomposed into a measure of tendency:

$$DR_i = A_{ii}DP_i + \sum_{j=1, j\neq i}^{m} A_{ij}DP_j + \sum_{j=m+1}^{n} A_{ij}DP_j, \tag{2}$$

for $i = 1, \ldots, m$, and a measure of variation:

$$\delta(DR_i) = A_{ii}\delta(DP_i) + \sum_{j=1, j\neq i}^{m} A_{ij}\delta(DP_j) + \sum_{j=m+1}^{n} A_{ij}\delta(DP_j), \tag{3}$$

for $i = 1, \ldots, m$.

Using equations 1, 2 or 3, the system can be defined in one of several ways. A system is an uncoupled design if $[A_{ij}]$ in equation 1 is diagonal or the last two terms in equations 2 and 3 are zero, that is, each $DR_i$ can be satisfied independently by means of one $DP_i$.

A system is a decoupled design if $[A_{ij}]$ in equation 1 is triangular or the last two terms in equations 2 and 3 have $A_{ij}=0$ for i<j or i>j, that is the independence of $DR_i$ can be guaranteed only if the $DP_j$ are changed in a proper sequence.

A system is a coupled design if $[A_{ij}]$ in equation 1 is a full matrix or if n<m, that is, the number of $DP_j$ is less than the number of $DR_i$. This means that each $DR_i$ cannot be satisfied independently by means of one $DP_j$. In this example, additional design parameters should be considered in the concept design stage.

A system is considered a robust design if the variability of the responses $\delta(DR_i)$ is a minimum in the presence of noise. The noise is surrogated by the variability of the design parameters $\delta(DP_j)$. The system is considered an optimal design when $\{DR_i\}=\{(DR_i)_o\}$ where $\{(DR_i)_o\}$ is considered an optimum response. A system is considered an optimal and robust design when the optimum setting of $DP_j$ to shrink $\delta(DR_i)$ and to shift the mean of $DR_i$ is identified and achieved.

The design is considered optimal and robust by applying the Independence Axiom and the Information Axiom. First, the independence of $DR_i$ must be maintained. To achieve this, the design matrix [Aij] must be either an uncoupled or decoupled design. The design preferably contains minimal information content to increase the capability of the system, that is $\delta(DR_i)$ is a minimum.

Thus, from equation 3, $\delta(DR_i)$ can be minimized by choosing $A_{ij}$ as small as possible but still much larger than $A_{ij}$. Robust improvement of a design can be accomplished using a combination of techniques. For example, in a redundant design the values of the extra $DP_j$ can be fixed by identifying the influential $DP_j$ on $\delta(DR_i)$ and then selecting a value range of $DP_j$ or a design window where DRi are insensitive to variation of the corresponding $DP_j$. This approach is known as parameter design in Quality Engineering. Alternatively, $\delta(DP_j)$ can be minimized using a technique such as statistical process control. The effect of both of these techniques is making the design insensitive to random variation.

In most systems with two or more responses, a feasible solution usually does not optimize all responses at once. That is, improvement in one response is at the cost of another response. For an axiomatic design, the $DR_i$ are not independent and $[A_{ij}]$ is not uncoupled or decoupled. For a multi-objective optimization, a feasible solution to a multiple response optimization problem is considered pareto-optimal if there exists no other feasible solution that will bring an improvement in one response without degrading at least one other response. Therefore, a pareto-optimal solution can be generated when the design complies with the Independence Axiom.

Advantageously, this methodology systematically treats each response independently, and uses a rational shrink and shrift procedure to identify a design space that gives a pareto-optimal and robust solution. The methodology finds solutions for conflicting responses based on rigorous axiomatic design principles that provide a pareto-optimal, robust and ideal solution.

The methodology begins with step 100. In step 100, the user formulates the design study by establishing objectives and constraints that are related to the physics of the system. The objectives and constraints can be broad or narrow, and should relate to some aspect of the product. Combustion design in a cylinder head 50 has traditionally been a design trade-off between maximizing airflow rate required for power and maximizing charge motion ratio or turbulence required to promote good air-fuel mixing. In turn, good air/fuel mixing promotes improved fuel economy, lower exhaust emissions and enhanced engine idle performance. In this example, the design study objective relates to the effect of engine cylinder head manufacturing and machining variability on various design responses, such as airflow rate and charge motion in a V-engine cylinder head port and chamber assembly 50. Both of these responses are a function of parameters, such as mask height shown at 52, mask wrap in degrees shown at 54, squish factor shown at 56 and aspect ratio shown at 58. Other cylinder head parameters include material, such as aluminum, casting process, such as semi-permanent mold, or machining process, such as machining process. It should be appreciated that a predetermined variability, such as 5% may be assigned to each parameter. The methodology advances to step 105.

In step 105, the user 26 lays out the experiment by identifying the design parameters, creating an optimal design space that represents a response surface for the system, and running a simulation to obtain a design response based on the selected optimal design. For example, the user 26 identifies the design parameters and design responses, including number, range and level, based on the physics of the system. In this example, the design parameters include mask height 52, mask wrap 54, squish factor 56 and aspect ratio 58, aluminum material, semi-permanent mold casting process and transfer line machining process. Also in this example, the design response may include airflow rate and charge motion ratio. Both of these design responses are critical to quality as they relate to engine power, fuel economy and emission calibration. It should be appreciated that the uncertainty of the design parameter should be included in the determination of the range of the design parameter. In this example, a 5% variability in each parameter is selected.

The user 26 also selects an optimal design space for representing a response surface of the system. Preferably, the design space is uniform. The user 26 also selects coefficients of the selected design parameter and the design responses. For example, the user 26 defines multiple dimensions. An increased number of parameters increases the complexity of the system. The space may be an orthogonal mesh, and the user 26 selects a point within the workspace. Various software is available in the art to create the design space, such as Latin Hypercube Sampling or Uniform Design.

The user 26 performs a simulation to obtain the design response based upon the selected optimal design, by surrogating noise factors to the identified design parameters. For example, a CAE software program 16 is utilized to perform this analysis. In particular, five levels of mask height, four levels of mask wrap, seven levels of squish and 6 levels of aspect ratio were evaluated in this example. The CAE tool 16 computational fluid dynamics (CFD) is utilized to evaluate the model at four different valve lifts to simulate an actual system.

The methodology advances to step 110, and the methodology utilizes a statistical analysis tool 28 to determine the response surface. The methodology also checks how well the model fits within the response surface, and validates the model using the simulation results. In this example, the methodology computes the weighted average of the experimental results from the different valve lifts and uses the weighted averages to determine the response of the system to increased airflow or increased charge motion. Various mathematical techniques are known in the art for determining the response surfaces, such as a polynomial regression, a Gaussian regression, or a Multiple Adaptive Regression Splines (MARS). Additional software can be utilized to determine how well the response fits the residual. It should be appreciated that the response surface may be modeled in more than one dimension.

For example, the following equations represent second order response surfaces for this example:

$$\text{Charge Motion Ratio} = 3.036 - 0.026x_1 + 0.002x_2 - 0.059x_3 - 4.751x_4 + 0.004x_1^2 - 0.001x_3^2 + 2.113x_4^2 - 0.002x_1x_e + 0.037x_1x_4 + 0.072x_3x_4 \quad (4)$$

$$\text{Airflow Rate} = 88.4 + 1.0x_1 + 0.5x_3 + 371.5x_4 - 0.1x_3^2 - 170.7x_4^2 - 5.3x_1x_3 - 1.7x_3x_4 \quad (5)$$

It should be appreciated that an example of how to formulate the problem, lay out the experiment and find the response surfaces in one dimension are disclosed in U.S. Patent Application Publication Number US 2002/0143503, which is incorporated herein in its entirety.

The methodology advances to step 115 and the user 26 utilizes the statistical analysis tools to determine the location and dispersion of the design response in accordance with the defined objectives and constraints. The methodology attempts to reduce the variation in the response, and may look at several parameters simultaneously. For example, the methodology rebalances the design space to obtain a fractional or full factorial design. The methodology also determines the median and inter-quantile range of the design parameter using a statistical reliability technique. An example of a reliability technique known in the art includes a First Order Reliability Method (FORM), Second Order Reliability Method (SORM), Saddle Point Approximation Method (SPAM) or Quasi-Monte Carlo.

In this example, the above response surfaces include the median (M) as a tendency measure, and a 5-95% inter-quantile range (IQR) as a variation measure. Median and 5-95 IQR as tendency and variation measures respectively are considered robust relative to the non-normality of experimental results. The methodology advances to step 120.

In step 120, the methodology utilizes the statistical tools 28 to determine the total percentage contribution of each parameter DP to the total output response, including output variation, and the total main effect values at each response level of the DP. Advantageously the methodology is looking beyond the median to an optimal and robust solution, to reduce the variation in the response.

For example, ANOVA is a global sensitivity analysis that calculates the main and interaction effects of the parameters on the responses. ANOVA is also known as Sobol's sensitivity index. This approach decomposes DR into orthogonal functions of increasing dimensionality. If interaction among parameters exists, or $A_{ij}$ is a function of DP, the influence of the parameters must include interaction effects. The total influence of each parameter, including its interaction effects on the responses, can be measured using Fourier Amplitude Sensitivity test (FAST) or a Monte Carlo Simulation. It should be appreciated that in the presence of strong interaction among the parameters, the main effects are less important.

Figure 4A:
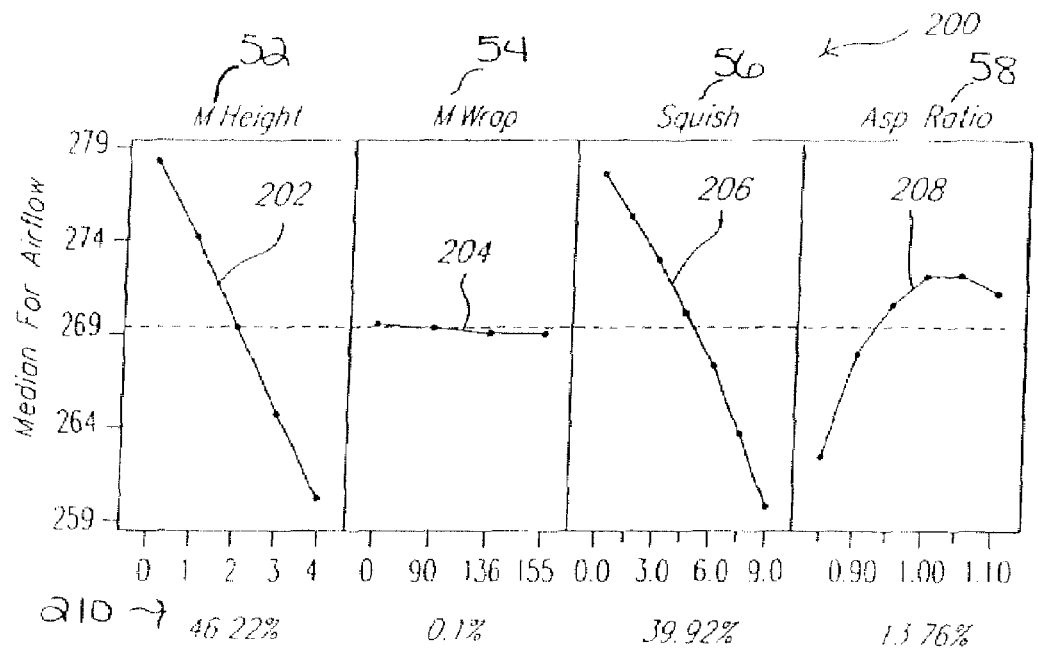
FIGS. 4a-4d are diagrammatic views illustrating the effect of the design parameters mask height, mask wrap, squish and aspect ratio on the design response, according to the present invention.
Figure 4B:
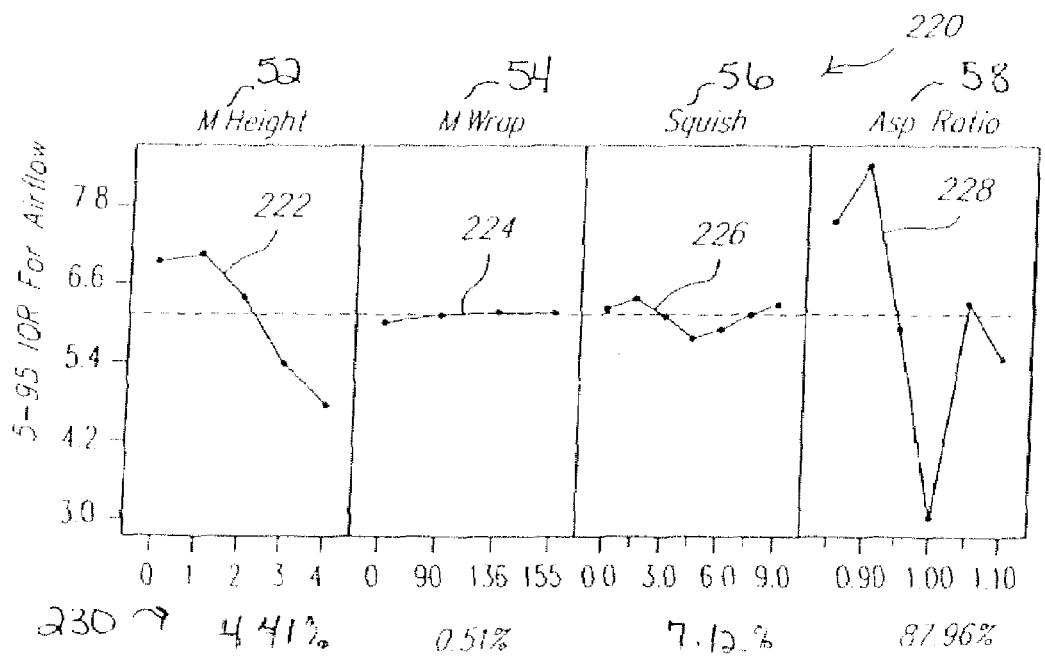
Figure 4C:
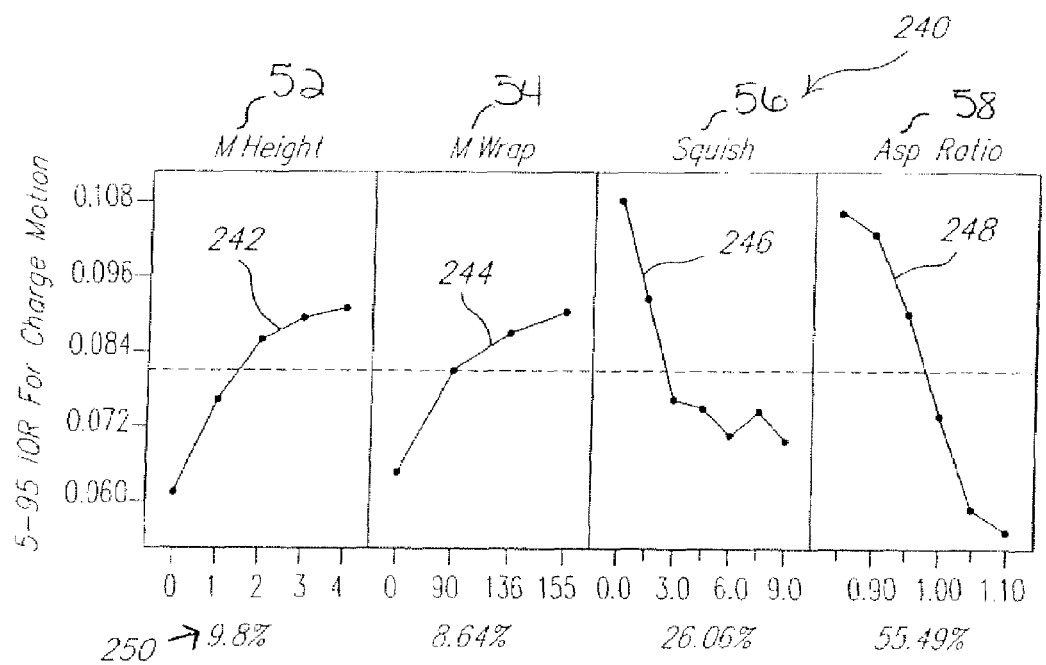
Figure 4D:
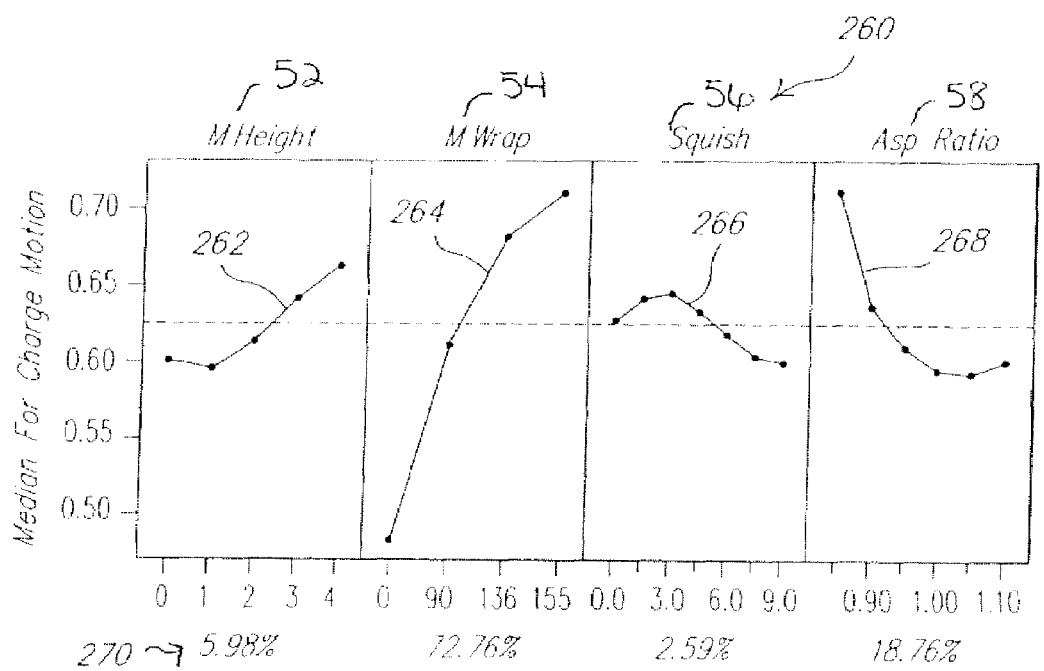

In this example, the methodology analyzes seventeen parameters, four responses, and determines the contribution of each parameter to each response. Referring to FIGS. 4a-d, the design response of the system due to the design parameters mask height, mask wrap, squish and aspect ratio are illustrated graphically. In FIG. 4a the effect on median airflow, as shown at 200, is illustrated for each of the parameters at 202, 204, 206 and 208 respectively. In FIG. 4b, the effect on 5-95% interquantile range, as shown at 220, is illustrated at 222, 224, 226 and 228 respectively. In FIG. 4c, the 5-95% interquantile range for charge motion as shown at 240 is illustrated at 242, 244, 246 and 248 respectively. In FIG. 4d, the median for charge motion ratio as shown at 260 is illustrated for each of the parameters at 262, 264, 266 and 268 respectively. The percentage influence of each parameter value on the response is indicated below each of the plots, as shown at 210, 230, 250 and 270 respectively. From the plot, it can be ascertained whether the corresponding parameter has a non-significant, negative significant or positive influence on the corresponding design response.

The methodology advances to step 125 and the user 26 determines a cut-off value used to classify the percent contribution. The cut-off value is preferably selected based on percent contribution and engineering knowledge. The user 26 looks at the influence of the parameter on the response and tries to achieve an ideal design using axiomatic principles. In this analysis, a cut-off value of 5% is utilized.

For example, a parameter has a significant influence on the nominal response or the variation of the response if its percentage influence is greater than the specified cut-off value. If a parameter has a significant influence on all variations $\delta(DR_i)$, then a parameter level that minimizes at least one variation $\delta(DR_i)$ is selected by the user 26 as a fixed value of the extra unnecessary parameter. A parameter has a dominant influence on the nominal response or the variation of the response if its percentage influence is greater than the total percentage of the rest of the factors. If a parameter has a dominant influence on at least one $\delta(DR_i)$, then a parameter level that minimizes this $\delta(DR_i)$ is selected, regardless of its significance on other $\delta(DR_j)$ or $DR_i$. The goal is to reduce variation on the design response. If a parameter has a dominant influence on at least one $DR_i$, but not on any $\delta(DR_i)$, then this parameter is maintained as a control factor. Factors whose percentage influence is less than a specified cutoff value are insignificant. Advantageously, the methodology looks at the influences on the system to achieve an ideal design using axiomatic principles. The methodology advances to step 130.

In step 130, the methodology determines if any total main effect values of each significant or dominant design parameter $DP_j$ violates the constraints in order to reduce the space further. For example, a statistical tool 28 such as ANOVA can be utilized to calculate main and interaction effects of the parameters on responses. This approach decomposes $DR_i$ into orthogonal functions of increasing dimensionality. If interaction among parameters or $A_{ij}$ is a function of $DP_j$, the influence of the parameters needs to include interaction effects. The total influence of each parameter, including interaction effects, on the responses can be measured using another statistical tool 28, such as a Fourier Amplitude Sensitivity Test (FAST) or a Monte Carlo Simulation. It should be appreciated that with strong interaction among the parameters, the main effects may be irrelevant.

Figure 5A:
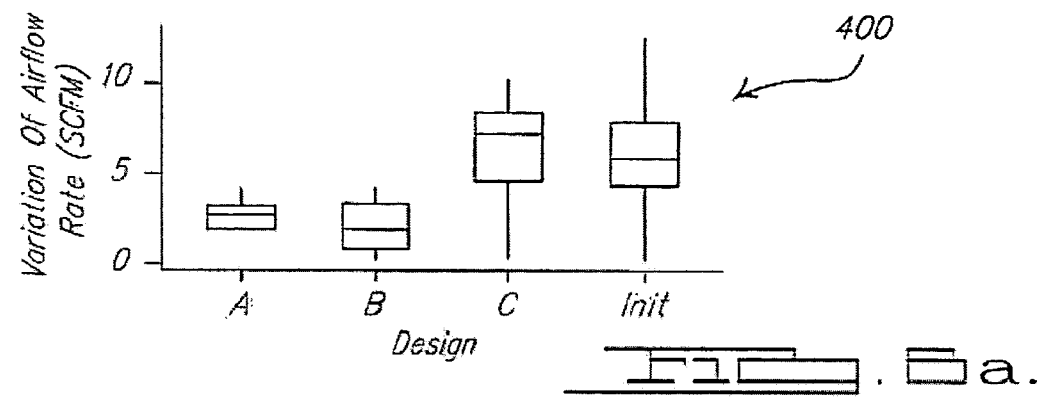
FIGS. 5a-5b are tables illustrating the interaction effects of the design parameters on the design response, according to the present invention.
Figure 5B:
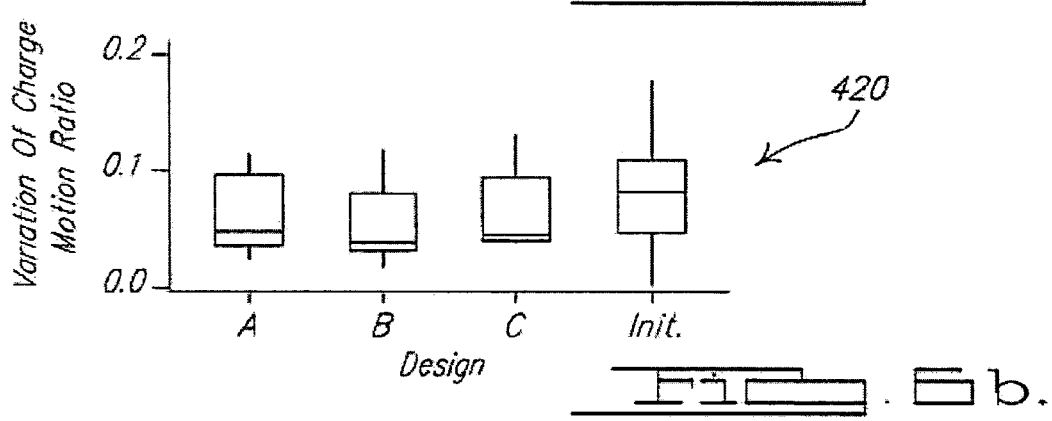
Figure 5C:
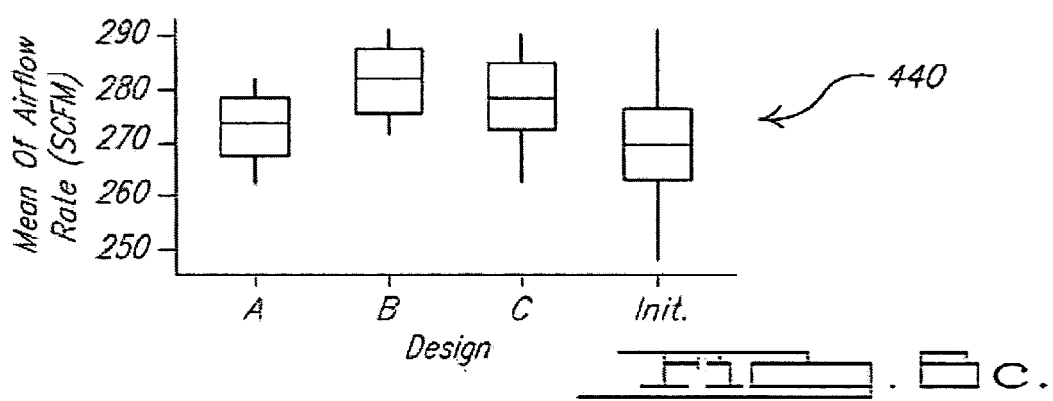
Figure 5D:
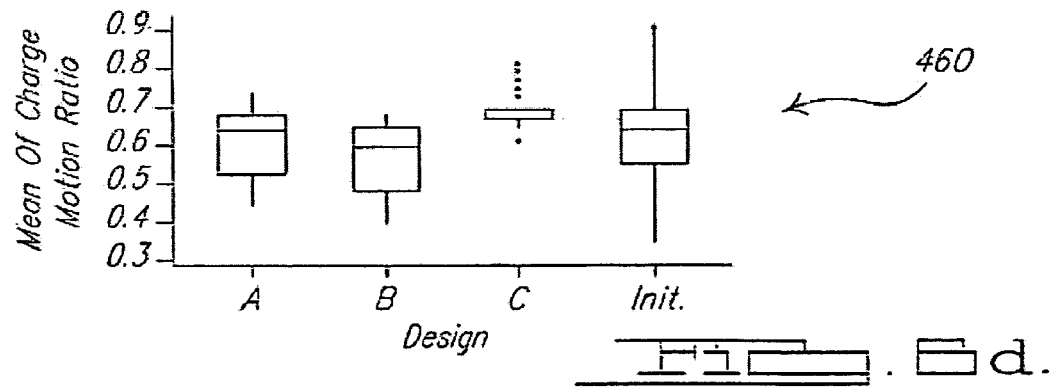

Referring to FIGS. 5a and 5b, the interaction effects are analyzed by calculating the variation reduction and optimality improvement of each proposed ideal design is illustrated. The table in FIG. 5a as shown at 300 illustrates the statistical results obtained by variation reduction analysis for the 5-95 IQR of airflow rate and charge motion ratio. The table in FIG. 5b as shown at 350 illustrates the statistics used for optimality improvement analysis for M of airflow rate and charge motion ratio. If any total main effect value does violate the constraint, the methodology advances to step 135.

In step 135, the methodology reduces the design space further by eliminating the corresponding levels that violate the constraints. It should be appreciated that a shrink strategy is utilized to reduce the design space. The methodology advances to step 140.

In step 140, the methodology identifies feasible solutions. For example, referring back to FIGS. 4a-4b, it can be determined that the parameter aspect ratio has a dominant effect on the 5-95 IQR of airflow rate and charge motion ratio, i.e. 87.96% shown at 228 and 55.49% as shown at 248 respectively. It also has a significant effect on M of airflow rate and charge motion ratio, i.e. 13.76% shown at 208 and 18.76% shown at 268 respectively. Thus, it can be assumed that aspect ratio has a 55-88% influence on the variability of the design responses, but 14-19% influence on optimality of the design. Squish has a significant effect on 5-95 IQR of both airflow rate and charge motion ratio and on M of airflow rate. Mask height has a significant influence on 5-95 IQR charge motion ratio and on M of airflow rate and charge motion ratio. Mask wrap has a significant effect on 5-95 IQR charge motion ratio and a dominant effect on M of charge motion ratio.

Since aspect ratio has a dominant effect on both design responses, aspect ratio is selected as a fixed noise factor. Similarly, mask wrap has a dominant effect on charge motion ratio and is maintained as a control factor. Preferably, one more parameters are fixed to obtain an ideal design. It should be appreciated that fixing mask height and aspect ratio will provide an uncoupled design, and fixing squish and aspect ratio will provide a decoupled design.

The methodology advances to step 145, and an ideal design is selected by determining whether any total main effect values for each significant or dominant design parameter $DP_j$ minimize significantly the dispersion of the data. If a total main effect value for each significant or dominant design parameter does minimize the dispersion of the data, the methodology advances to block 150. In block 150 the design parameter is fixed at the current level.

In this example, two ideal designs have been identified as candidates to be optimized. Design A is a decoupled design selected by fixing the aspect ratio at 1.00 and squish at 4.5 mm; and Design B is an uncoupled design selected by fixing the aspect ratio at 1.00 and mask height at 0 mm. In this example, aspect ratio is selected, since at an aspect ratio of 1.0, the airflow rate has the highest variation but a small loss in optimality. Squish is selected at 4.5 mm to bring about the highest variation reduction on both the responses, while recognizing the optimal airflow rate may experience a moderate increase. Selecting a mask height at 0 mm gives the highest variation reduction on charge motion ratio and the highest optimal airflow rate, although this gives a moderate decrease in the optimal charge motion ratio. Referring back to FIGS. 5a and 5b, on average, both Designs A and B consistently reduce variation (25%-66%) and increase the optimality of airflow rate (1.3%-4.7%), though they decrease the optimality of charge motion ratio (0.5%-10%). The table also shows that Design B is superior to Design A in variation reduction and optimal airflow rate, but not optimal charge motion ratio. The methodology advances to step 155 and continues.

Returning to step 145, if a total main effect value for each significant or dominant design factor does not minimize the dispersion of the data, the methodology advances to step 155.

It should be appreciated that the previous steps find any possible ideal design to satisfy the Independence Axiom, that is to find an uncoupled or a decoupled design. Fixing some $DP_j$ is equivalent to seeking a reduced design space that gives an independent DR. Therefore, by reducing information content, the Independence Axiom is simultaneously satisfied. It should be appreciated that an uncoupled or decoupled design may not be found due to the non-ideal and complex status of the existing design or because the elements A of the first two terms of equations (2 and 3) are rarely zeros or small. If this occurs, the existing design should be revised to achieve a design that satisfies each DR independently by means of an unknown DP that introduces random variation. Advantageously, the above-described process ensures that the design is more robust.

In step 155, the methodology identifies the most robust, ideal solution. It should be appreciated that there may be more than one possible robust solution at this step of the methodology. A robust ideal solution is a design solution selected from the various ideal design solutions that is most uncoupled or decoupled, based on the degree of coupling, variation reduction measures, and optimality measures. In this step, the design parameter $DP_j$ that has a lower degree of coupling with the design response $DR_i$ is selected. This selection is a trade-off between low information content that makes a design more robust and a lower degree of coupling that has less influence on optimality. If this tradeoff process still proposes equivalently more than one design, then other criteria, such as engineering judgment or cost considerations, are utilized to select one reasonable design. Preferably, the percentage influence of $DP_j$ on $DR_i$ determined using ANOVA is used as a measure of the degree of coupling of a design.

For example, the methodology calculates the variation and optimal improvement of each design from the set of designs selected in the previous step. The user 26 selects one design that has the greatest improvement for an uncoupled or decoupled design. That is, the selected design has parameters that independently influence the design response $DR_i$.

The methodology continues to step 160 if the selected design is an independent design response or uncoupled design or decoupled design. If the selected design is not an independent design response, the methodology returns to step 135 and continues to evaluate all levels, such that the level minimizes at least one $\delta(DR_i)$, to filter out the dominant or inferior design. Advantageously, the dominant or inferior design is filtered out regardless of the independency of the design response.

In step 160, the methodology continues to search for the most robust ideal design by searching for a design window or a value range of the remaining $DP_j$ obtained from the previous step, where the $DR_i$ are the most insensitive to variation of the corresponding remaining $DP_j$. For example, the methodology determines whether to narrow down the search at reduced bounds or at the neighborhood of the predetermined levels. If determined to narrow down the search, the methodology advances to step 165.

In step 165, the methodology modifies the design parameter levels to further reduce the information content on the improved ideal design by exploiting the non-linearity of the interaction among the parameter A. If the design selected in the previous step still violates the Independence Axiom, the methodology continues the iteration of this step to obtain a design space that gives the most robust, but un-ideal design. It should be appreciated that all of the above-enumerated steps are based on a shrink strategy which removes dominated or inferior solutions obtained as a result of random variation. The methodology returns to step 140 and continues to shrink the design space by computing the location and dispersion of the design response of objectives and constraints.

If determined not to narrow down the search, the methodology advances to step 170. In step 170, the pareto-optimal solution from the most robust ideal design is obtained. This solution is the non-dominated or non-inferior solution from the most robust solutions obtained by the previous steps. If the design is uncoupled, there is one optimal robust solution. If the design is decoupled, or coupled, this step will provide the pareto-optimal solution as a line on the edge of the solution space known as the pareto-optimal frontier. It should be appreciated that this step relies on the shift strategy. For example, the most robust ideal design is optimized by selecting the nominal values or the range of values of DP according to the proper sequence, that make the DR independent, so that the design satisfies the Independence Axiom.

The methodology advances to step 175, and the pareto-optimal solution is available for further analysis.

Advantageously, the described shrink and shift strategy is a trade-off approach resulting in the elimination of dominated designs. How accurately the methodology identifies uncoupled or decoupled designs, that is the non-dominated design, depends on the determination of the cut-off value. Therefore, if the user doesn't want any dominated designs or wants to eliminate some non-dominated designs to reduce the cost or processing the final design, a higher cut-off value may be selected.

Therefore, ANOVA and statistical techniques are used as part of a shrink strategy to find the best ideal design solution and then the shift strategy is utilized to obtain the optimal and robust design solution. Advantageously, the above-described methodology uses a systematic procedure of finding solutions for conflicting responses based on rigorous axiomatic design principles that provide a pareto-optimal robust and ideal solution.

Referring to FIGS. 6a-6d, the benefit of selecting an uncoupled design (Design A) and a decoupled design (Design B) developed using the above-described methodology versus an initial design and a coupled design (Design C) is illustrated as 400, 420, 400 and 460 respectively. Within each box, the midline indicates median of the box. The bottom and top edges of the box denote the first ($25^{th}$ percentile) and third (75%) quartiles, respectively.

Figure 7:
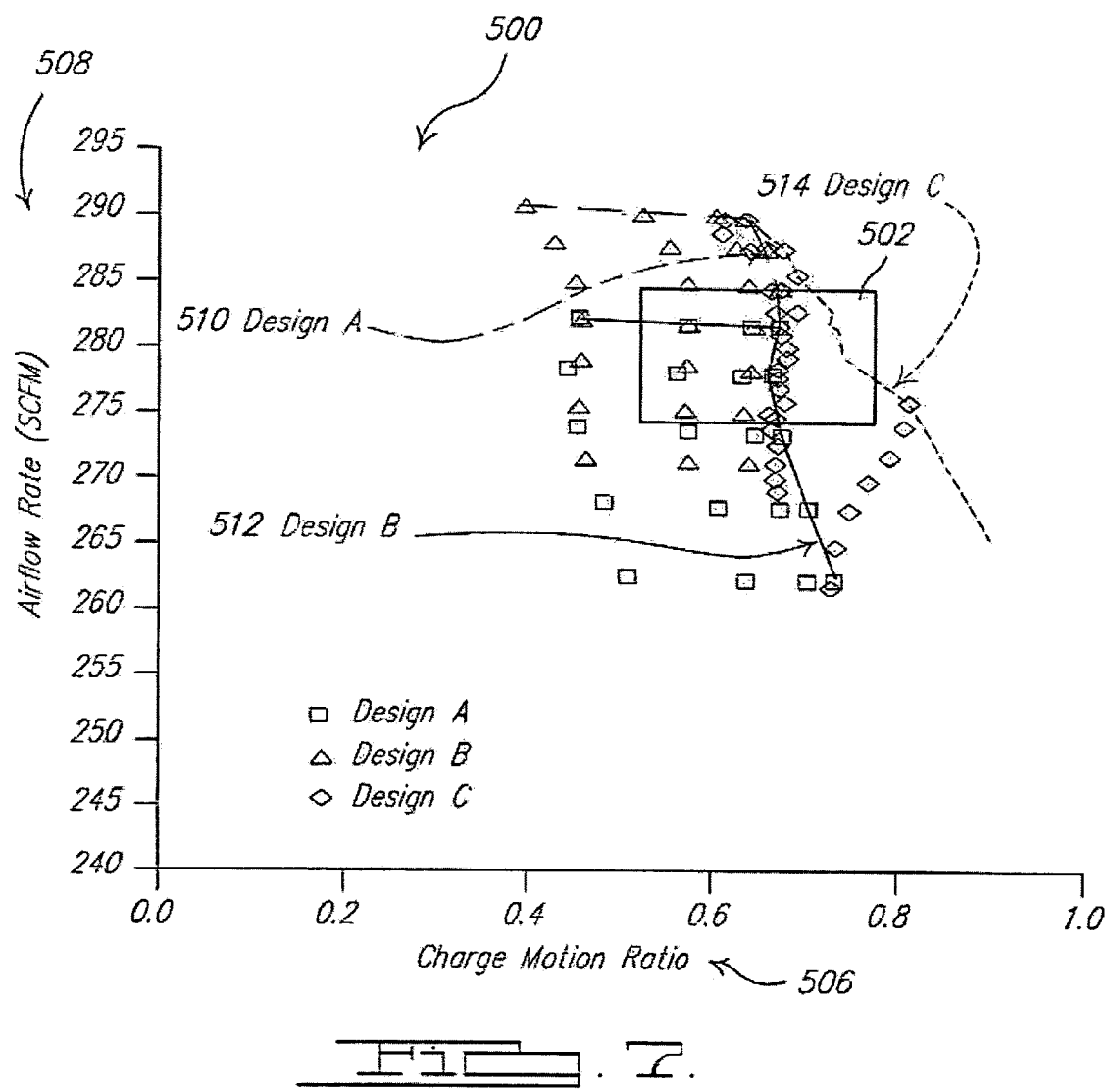
FIG. 7 is a graph comparing the responses and variability of each design, according to the present invention.

Referring to FIG. 7, the responses and the variability of each design respectively are illustrated as shown at 500. The X-axis represents charge motion ratio 506, and the Y-axis represents airflow rate 508. The methodology locates the window 502 in the design space, and the solution is found within the window. The pareto-optimal solution of these designs is the frontier lines of these solutions as shown at 510, 512 and 514 respectively for each of the designs. From this figure, it can be seen that both Design A and Design B gain significant variation reduction, but lose the optimality of the charge motion ratio.

Among the selected designs, Design B is superior since it is uncoupled and the most robust. The pareto-optimal solution represented by the frontier of Design B is the best design as shown at 512.

In an alternative embodiment, the window is set automatically, and the pareto-optimal and robust solution is found within the window. In addition, the methodology automatically determine all feasible combinations of pareto-optimal and robust solutions.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A computer implemented method of interactive design of a component part associated with a vehicle that is a pareto-optimal and robust product design using design parameters and design responses, said method comprising the steps of:

determining a plurality of design parameters associated with the component part and modeling corresponding design responses;

determining a location and dispersion of each of the design responses within a design space, wherein the design space is a response surface of the design responses;

determining a total percentage contribution of each design parameter to each of the design responses;

determining a cut-off value for classifying the percent contribution of each design parameter to each of the design responses;

using the cut-off value to classify the percent contribution of each design parameter as having a significant influence or a dominant influence on a variable design response;

determining if a total main effect value of a classified significant influence design parameter or a classified dominant influence design parameter violates a predetermined condition, and further reducing the design space if the total main effect value violates the predetermined condition;

identifying an ideal product design, by classifying each significant influence design parameter or each dominant influence design parameter as a necessary or an unnecessary design parameter, each significant influence design parameter or each dominant influence design parameter is an unnecessary design parameter if the corresponding total main effect value has a predetermined significant influence on a variable design response, and fixing the unnecessary design parameter at the total main effect value, if the total main effect value for each significant influence design parameter or each dominant influence design parameter has a predetermined significant influence on the variable design response;

determining a most robust ideal product design by calculating a variation and an optimal improvement of the identified ideal product design, and selecting a most robust product design that has a predetermined optimal improvement and is an uncoupled design or a decoupled design and continuing to iteratively reduce the design space until the most robust ideal product design is selected; and optimizing the selected most robust ideal product design to obtain a pareto-optimal and robust product design, wherein the pareto-optimal and robust product design includes a design parameter having an independent design response, and the pareto-optimal and robust product design improves one design response without degrading another design response; and using the pareto-optiamal and robust product design of the component part for the vehicle associated therewith.

2. A method as set forth in claim 1 further including the steps of:

identifying the ideal product design as an uncoupled design if each design response is satisfied independently using at least one design parameter;

identifying the ideal product design as a decoupled design if the design response is independent and the necessary design parameters are changed in a predetermined sequence;

identifying the ideal product design as an ideal design if the number of design parameters is equivalent to the number of design responses;

identifying the ideal product design as a robust design if the variability of the design response is a minimum in a presence of noise; and identifying the ideal product design as an optimal and robust design if the optimum value of the necessary design parameter is selected to shrink the variable design response and to shift a dominant influence of the design response.

3. A method as set forth in claim 1 wherein said step of identifying an ideal product design further includes the steps of:

classifying the identified unnecessary design parameter as a noise factor if it has a significant influence on the variable design response with little influence on a nominal design response;

fixing a nominal value of the identified unnecessary design parameter for which a variable design response is a minimum value and the ideal product design is an uncoupled design or a decoupled design; and classifying the identified necessary design parameter as a control factor if the necessary design parameter has a dominant influence on at least one design response but not on any variable design response.

4. A method as set forth in claim 3 wherein the identified unnecessary design parameter has a significant influence on the design responses or the variable design responses if a percentage influence of the identified unnecessary design parameters is greater than a predetermined cut-off value and the identified unnecessary design parameter has a dominant influence if the percentage influence of the identified unnecessary design parameter is greater than a predetermined total percentage influence of the necessary design parameters, and the identified unnecessary design parameter has an insignificant influence if the percentage influence of the identified unnecessary design parameter is less than the predetermined cut-off value.

5. A method as set forth in claim 3 wherein said step of selecting a most robust ideal product design further includes the steps of:

determining a variation and an optimal improvement of the identified ideal product design;

selecting the most robust ideal product design that has the most improvement and is an uncoupled design or a decoupled design; and identifying a value range for the identified necessary design parameter having a corresponding design response that is the most insensitive to a variation in other necessary design parameters.

6. A method as set forth in claim 5 wherein said step of selecting the most robust ideal product design further includes the steps of:

iteratively filtering out a dominated ideal product design or an inferior ideal product design by determining if the selected most robust ideal product design is independent.

7. A method as set forth in claim 1 wherein said step of optimizing the selected most robust ideal product design further includes the steps of selecting a nominal value of the identified necessary design parameter, so that the design response of the selected most robust product design is independent.

8. A method as set forth in claim 7 wherein the selected most robust product design includes a design space of design parameters and corresponding design responses that shrinks and shifts to locate the selected most robust design within the design space, according to a percent influence of each of the necessary design parameters, a main effect of each of the necessary design parameters and an interaction between the necessary design parameters.

9. A method as set forth in claim 8 wherein the pareto-optimal and robust product design is used to redesign an existing product.

* * * * *